(12) United States Patent
Borge et al.

(10) Patent No.: US 10,761,603 B2
(45) Date of Patent: Sep. 1, 2020

(54) COMPUTING DEVICE ACCESSIBILITY VIA EYE TRACKING

(71) Applicant: Tobii AB, Danderyd (SE)

(72) Inventors: Anders Borge, Danderyd (SE); Anna Belanova, Danderyd (SE); Chiel van de Ruit, Danderyd (SE); Chris Edson, Danderyd (SE); Christopher Badman, Danderyd (SE); Dmitriy Sukhorukov, Danderyd (SE); Joel Ahlgren, Danderyd (SE); Ole Alexander Mæhle, Danderyd (SE); Ragnar Mjelde, Danderyd (SE); Sveinung Thunes, Danderyd (SE); Xiaohu Chen, Danderyd (SE)

(73) Assignee: Tobii AB, Danderyd (CH)

( * ) Notice: Subject to any disclaimer, the term of this patent is extended or adjusted under 35 U.S.C. 154(b) by 0 days.

(21) Appl. No.: 16/161,755

(22) Filed: Oct. 16, 2018

(65) Prior Publication Data

US 2019/0113969 A1 Apr. 18, 2019

Related U.S. Application Data

(60) Provisional application No. 62/572,905, filed on Oct. 16, 2017.

(51) Int. Cl.
*G06F 3/01* (2006.01)
*G06F 3/0484* (2013.01)
(Continued)

(52) U.S. Cl.
CPC .............. *G06F 3/013* (2013.01); *G06F 3/01* (2013.01); *G06F 3/0481* (2013.01);
(Continued)

(58) Field of Classification Search
CPC . G06F 3/013; G06F 16/34; G06F 3/01; G06F 3/0484; G06F 3/04842;
(Continued)

(56) References Cited

U.S. PATENT DOCUMENTS

| 8,166,412 B2 * | 4/2012 | Jain ..................... G06F 3/04842 715/700 |
| 2013/0169560 A1 * | 7/2013 | Cederlund .............. G06F 3/013 345/173 |

(Continued)

FOREIGN PATENT DOCUMENTS

EP 3470962 A2 4/2019

OTHER PUBLICATIONS

"Eyes Only: Navigating Hypertext with Gaze" by Penkar, Abdul Moiz, Department of Computer Science, University of Auckland, first presented at Interact, Sep. 2-6, 2013.

*Primary Examiner* — Andrey Belousov
(74) *Attorney, Agent, or Firm* — Samuel Yamron

(57) ABSTRACT

A method is disclosed for providing increased accessibility for users of a computing device. The method may include analyzing content on a display device to identify a plurality of interactive elements most likely to be interacted with. The method may also include causing each of the plurality of interactive elements to be highlighted in a different manner. The method may additionally include causing a plurality of graphical elements to be displayed, where each of the plurality of graphical elements may be associated with a different interactive element and may visually correspond with highlighting of its associated interactive element. The method may moreover include determining a location of the user's gaze on the display device and causing a particular interactive element to be activated, based at least in part on the user gazing at its associated graphical element, where (Continued)

activation of the particular interactive element causes display of new content.

18 Claims, 6 Drawing Sheets

(51) Int. Cl.
*G06F 16/34* (2019.01)
*G06F 3/0481* (2013.01)

(52) U.S. Cl.
CPC ........ *G06F 3/0484* (2013.01); *G06F 3/04842* (2013.01); *G06F 16/34* (2019.01)

(58) Field of Classification Search
CPC ................. G06F 3/0481; G06F 3/0482; G06F 2203/04806; G06F 3/0487
USPC ........................................ 715/700
See application file for complete search history.

(56) References Cited

U.S. PATENT DOCUMENTS

| | | | |
|---|---|---|---|
| 2016/0195924 A1* | 7/2016 | Weber | G06F 3/0304 345/156 |
| 2017/0235360 A1 | 8/2017 | George-Svahn | |
| 2017/0293402 A1 | 10/2017 | Morris | |

\* cited by examiner

FIG. 5

COMPUTING DEVICE ACCESSIBILITY VIA EYE TRACKING

CROSS-REFERENCE TO RELATED APPLICATIONS

This application claims priority to, and the benefit of, U.S. Provisional Patent Application No. 62/572,905, filed Oct. 16, 2017, the entire contents of which are hereby incorporated by reference, for all purposes, as if fully set forth herein.

BRIEF SUMMARY OF THE INVENTION

In one embodiment, a method is disclosed for providing increased accessibility for users of interactive displayed content on a computing device and executing commands from these users on the computing device. The method may include analyzing, with one or more processors, content displayed on a display device to identify a plurality of interactive elements most likely to be interacted with by a user. The method may also include causing, with the one or more processors, each of the plurality of interactive elements to be highlighted in a different manner. The method may additionally include causing, with the one or more processors, a plurality of graphical elements to be displayed on the display device. Each of the plurality of graphical elements may be associated with a different interactive element. Each of the plurality of graphical elements may visually correspond with highlighting of its associated interactive element. The method may moreover include determining, with at least an eye tracking device, a location of the user's gaze on the display device. The method may furthermore include causing, with the one or more processors, a particular interactive element to be activated, based at least in part on the user gazing at its associated graphical element, where activation of the particular interactive element causes the display device to display new content.

In another embodiment, a system is disclosed for providing increased accessibility for users of interactive displayed content on a computing device and executing commands from these users on the computing device. The system may include a display device, an eye tracking device, and one or more processors. The display device may be configured to display content to a user. The eye tracking device may be configured to determine a location of a user's gaze on a display device. The one or more processors may be configured to perform a method. The method may include analyzing content displayed on the display device to identify a plurality of interactive elements most likely to be interacted with by the user. The method may also include causing each of the plurality of interactive elements to be highlighted in a different manner. The method may further include causing a plurality of graphical elements to be displayed on the display device. Each of the plurality of graphical elements may be associated with a different interactive element. Each of the plurality of graphical elements may visually correspond with highlighting of its associated interactive element. The method may additionally include causing a particular interactive element to be activated, based at least in part on the user gazing at its associated graphical element, where activation of the particular interactive element causes the display device to display new content.

In another embodiment, a non-transitory machine readable medium is provided having instructions stored thereon for providing increased accessibility for users of interactive displayed content on a computing device and executing commands from these users on the computing device. The instructions may be executable by one or more processors to perform a method. The method may include analyzing content displayed on a display device to identify a plurality of interactive elements most likely to be interacted with by a user. The method may also include causing each of the plurality of interactive elements to be highlighted in a different manner. The method may further include causing a plurality of graphical elements to be displayed on the display device. Each of the plurality of graphical elements may be associated with a different interactive element. Each of the plurality of graphical elements may visually correspond with highlighting of its associated interactive element. The method may additionally include determining, using an eye tracking device, a location of the user's gaze on the display device. The method may moreover include causing a particular interactive element to be activated, based at least in part on the user gazing at its associated graphical element, where activation of the particular interactive element causes the display device to display new content.

BRIEF DESCRIPTION OF THE DRAWINGS

Embodiments of the present invention are described in conjunction with the appended figures:

FIG. 5 shows a display of text information implementing an embodiment of the invention.

Figure 1:
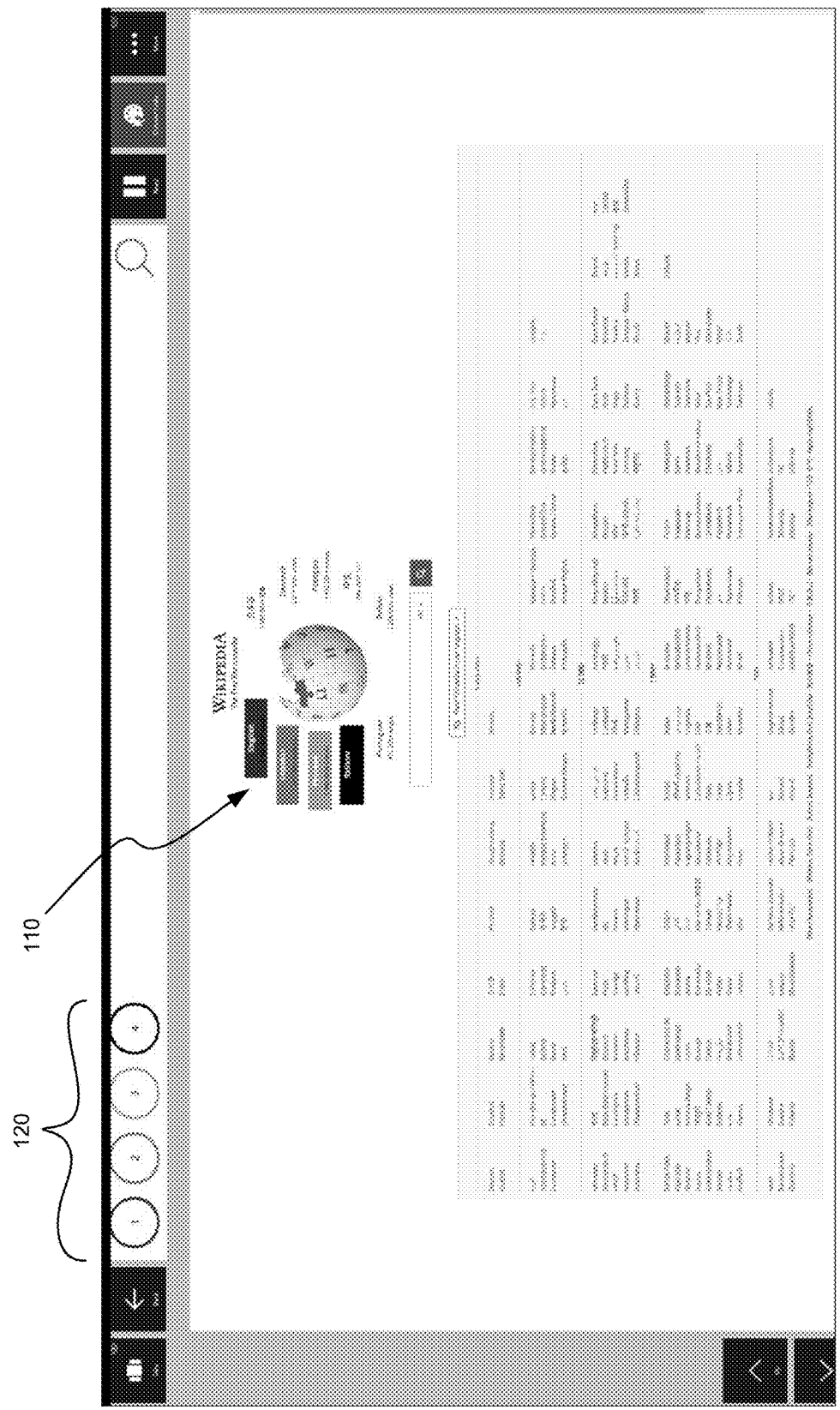
FIG. 1 shows a web-browser implementing one embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, common or well-known circuits, systems, devices, networks, techniques, processes, and other elements in the invention may be shown without unnecessary detail, or as components in block diagram form, in order to now obscure the embodiments in beneath unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention relate to systems, methods, and computer readable mediums having instructions thereon, for providing increased and/or enhanced ease of accessibility to users of a web browser or other software on a computing device. Some systems and methods for providing accessibility to users of web browsers are disclosed in "Eyes Only: Navigating Hypertext with Gaze" by Penkar, Abdul Moiz, Department of Computer Science, University of Auckland, first presented at INTERACT, 2-6 Sep. 2013 (available at www.interact2013.org/programme/pre-publication-versions-of-all-contributions as of at least Dec. 26, 2013). The entire publication of the above reference is hereby incorporated by reference, for all purposes, as if fully set forth herein.

The improved systems, methods, and computer readable mediums disclosed herein should be understood to include any software, similar and un-similar to web browsers, which display interactive content on a display device to the user, and allow the user to interact with such content. The content may include interactive hyperlinks and other interactive elements associated with, and located in, the content. For example, some content presented by web browsers or other software may provide for callable and dismissible pop-up windows which display additional information about certain particular content within the content displayed by the web browser. Though the methods and systems discussed herein may work with any software that displays interactive content, web browsers will be referred to in an exemplary manner herein to discuss the various embodiments.

While normally or often a user may use a conventional non-gaze-directed input device such as a keyboard, a mouse, a microphone, or a touch pad/screen to interact with the web browser, in embodiments of the present invention, a user may instead use their gaze, alone or complimented by a non-gaze input, to manipulate their viewing of, and interaction with, content within the web browser. This may allow a person with physical and/or mental limitations and/or disabilities to more easily control their interaction with the content provided by the web browser and the like, where otherwise control via a conventional non-gaze-directed input device may be less efficient for the user, particularly challenging for the user, or impossible for the user to employ, for whatever reason or preference particular to the user.

In one embodiment, a display is provided which is in communication with a processor such as a personal computer, a laptop computer, a notebook computer, a tablet computer, a mobile device, or other computing device. The computing device may direct the display to show content to the user based on the user's interactions with the computing device, and/or as the computing device has been otherwise configured to display content.

An eye tracking device may also be provided. This may include any device which is able to at least assist a computing device in determining a gaze direction of user with respect to the display. In some embodiments, the eye tracking device may be able to independently determine the gaze direction of the user, and simply inform the computing device of the gaze direction thereupon or thereafter.

Figure 2:
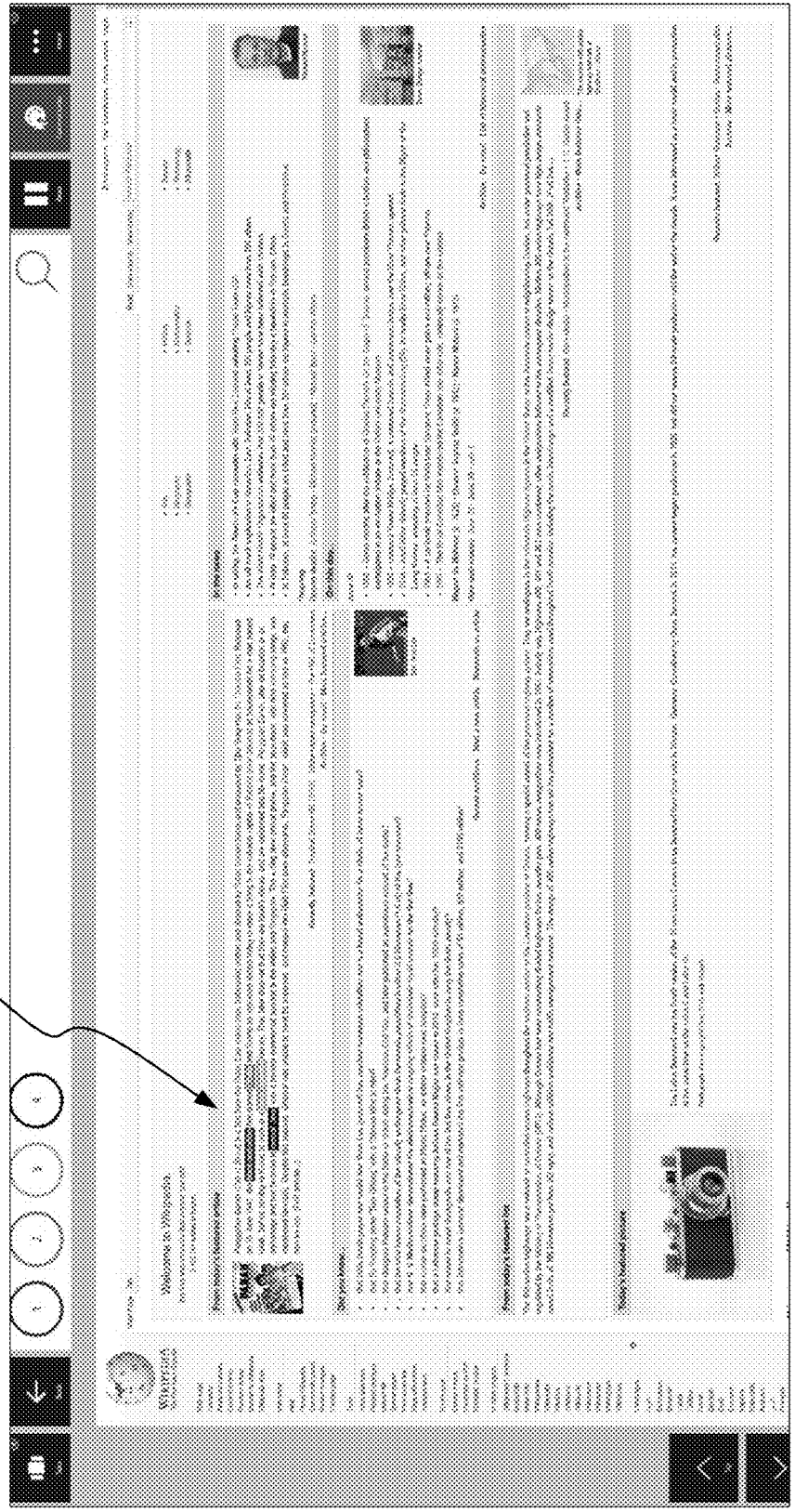
FIG. 2 shows a page of web content implementing another embodiment of the invention.

In some embodiments, a web page may be presented in a web browser on the display by the computing device. An example web page (i.e., Wikipedia™) in one web browser interface of the invention is shown in FIG. 1 for example. Content called by the web browser may be presented to the device, and that content may include interactable elements 110 (i.e., in this case, hyperlink interactable elements). In some embodiments, the computing device (and/or other components of the system described or not described in detail herein) may identify a number of interactive elements within the displayed content and modify the display/presentation of such elements to stand out from the content displayed. Which interactive elements are identified/selected for modified display will be discussed below. FIG. 2 shows another example where the interactable elements 210 (in this case textual hyperlinks) are located more in-line within text.

Merely by example, one, two, three, four, or any particular number more of interactive elements may be displayed differently as described, depending on the embodiment (also referred to herein as "highlighted"). See FIG. 1, highlighted interactable elements 110. By further way of example, a particular number of interactive elements (i.e., four), may be underlined (in a default or other color) and/or displayed in a different color (for example, either text, or background fill) than is normal or default for the remainder of the content. Four interactive elements may be selected as the number of elements to adjust or highlight the display thereof because it balances increased chance of reducing efficiency due to increased visual clutter, while still providing effective increased ease of accessibility. The number of elements highlighted may vary by embodiment, and the number of elements selected may be either static or dynamic depending on the particular embodiment. The number of elements highlighted may be fewer when a particular display of information is less dense or more dense with interactive elements. The number of elements highlighted may also be more when a particular display of information is less dense or more dense with interactive elements.

The type of underlining, color, and or other visual change/ highlighting may depend on the particular embodiment, and in some embodiments the particular visual change/highlighting employed may be determined based on the content an interactive element is displaying, or will display upon activation thereof. While in some embodiments, all interactive elements to be displayed with a visual change thereto in a particular single document/source will be similarly changed, in other embodiments, different interactive elements within the same document/source.

The color chosen for a particular highlighting may be dependent on the default or normal color of the interactable element prior to highlighting. For example, if a background highlighting is to be used for a textual or graphical interactable element, the primary color of the element may be determined by the system/method, and then an appropriately contrasting color may be chosen based thereon. Merely by way of example, in FIG. 1, the interactable elements which have been highlighted have had their text color inverted to white from blue, and had a block of a background color applied to such elements.

In addition to the highlighting methods already described, in some embodiments, a circle, box, other geometric shape, or other non-geometric shape may also be displayed surrounding elements so highlighted or nearby elements so highlighted, where each highlighted element corresponds or is associated with one of the geometric/non-geometric shapes. In some embodiments such shapes may also or alternatively appear at the top or side of the web page (thereby interfering less with presentation of the original content as-is) or be displayed near the interactable elements, and may correlate to different color/underline highlighting in the body of the content of the web browser (by displaying the shape (i.e., graphical element) in the same shape or color as the interactive element with which it is coordinated). As shown in FIG. 1, the circles 120 (i.e., graphical element) associated with interactable elements 110 are located at the top of the screen. Notice that the highlighted color of interactable elements 110, and the vertical order thereof, matches the color of the shapes 120 (i.e., graphical element), and the horizontal order thereof. Thus, in many embodiments, the graphical elements may visually correspond in any number of manners with their associated interactive elements.

Figure 3:
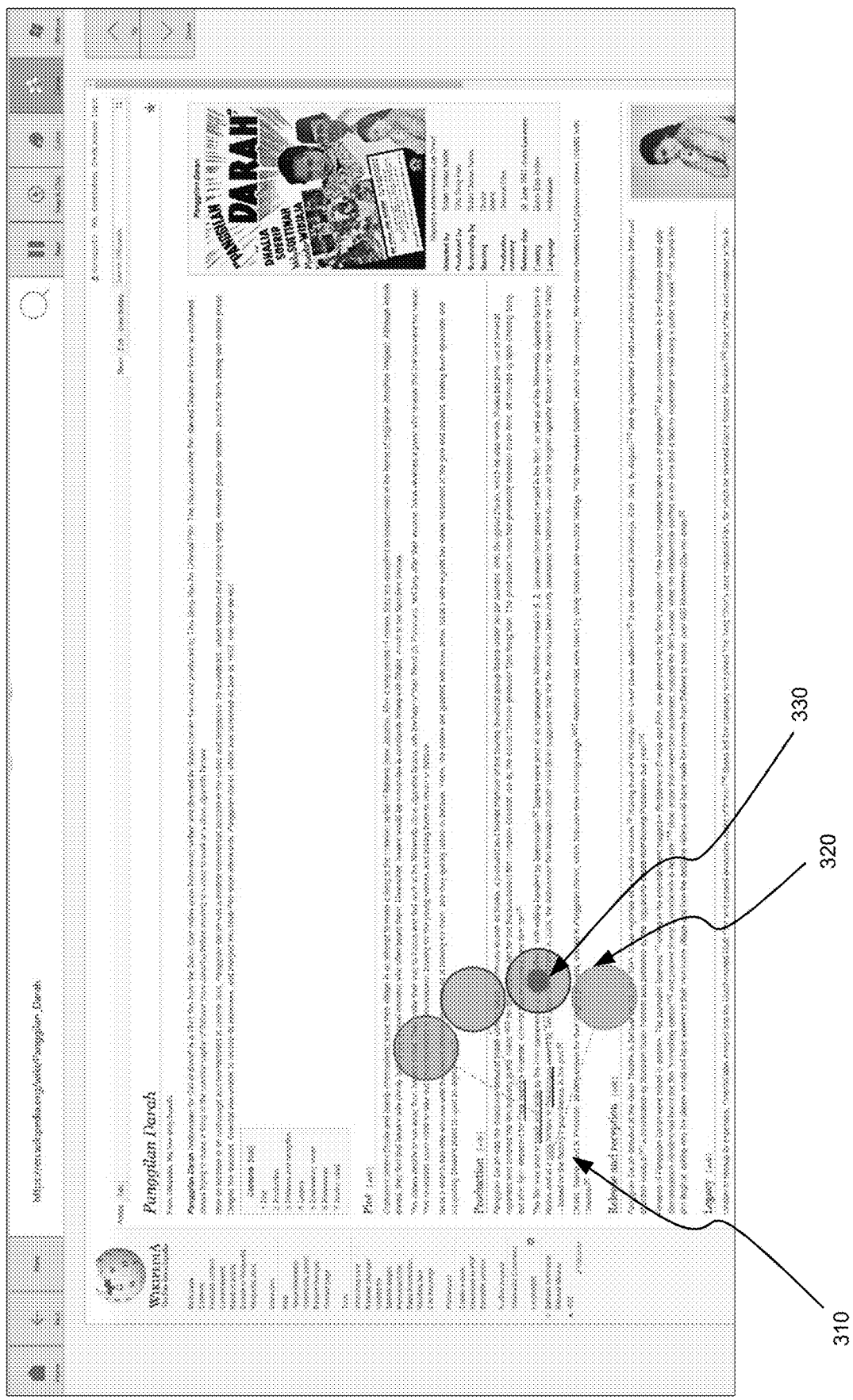
FIG. 3 shows another page of web content implementing another embodiment of the invention.

Displaying the shapes at the top or bottom of the display or web browser may be preferable to displaying the shapes on the side of the display or web browser as gaze interactions at the top and the bottom of the screen are more ascertainable than on the left and right side of a display. Thus, if left to right and top to bottom highlighted elements appear with red, green, blue, and orange highlighting, the shapes displayed to top, bottom, or side of the content will be presented in the order of red, green, blue, and orange. In other embodiments, the shapes may appear more in proximity to the highlighted content, and be, or not be, connected visually to the highlighted content by a dashed line, a solid line, or some other visual element. See FIG. 3 for a demonstration of this concept, where interactable elements 310 are underlined, and circle-shapes 320 (i.e., graphical elements) are displayed for each interactable element connected by a line leading to the interactable element.

An indicator 330 may indicate when the user is gazing at a circle-shape 320, and also be dynamic, and change from large to small, vice versa, or some other animation, thereby signaling the user how long their gaze must dwell on the shape 320 before the associated highlighted interactable element 310 is activated (i.e., activation may occur when indicator 330 disappears, when it becomes the same size as shape 320, or upon some other occurrence). For example, indicator 330 within a circle-shape 320 may originally be the same or nearly the same size as the circle-shape 320 where it is located, and get smaller continually or in steps until it disappears and the associated interactive element is activated.

Alternatively, circle-shape 320 itself may be dynamic, and upon being continually gaze at, become smaller and smaller in the same manner as described above until activation of the interactive element occurs when circle-shape 320 disappears. If a user averts their gaze from circle-shape 320 during the dynamic period of change of circle-shape 320, circle-shape 320 may revert to its original size/shape to signal to the user that the associated interactive element will not be activated unless re-gazed at by the user for the requisite predefined time. In some embodiments, the reversion of circle-shape 320 to its original size may occur at a specified rate, indicating that if the user returns their gaze to circle-shape 320 prior to circle-shape 320 returning to its original size, a gaze will only have to rest on circle-shape 320 for a remaining portion of the predefined length of time that is proportional to the ratio of the then current size of circle-shape 320 relative to circle shape's 320 original size.

The location of the graphical elements on the side or top of the display or web browser may be presented in the order of presentation of the interactable elements naturally within the content, or any other relative locational manner that corresponds with the locational manner in which the interactive elements are displayed. For example, the most upper left highlighted interactable element in the displayed content will be highlighted in a manner that correlates to the left-most and upper-most shape in a series/listing of coordinated matching related shapes located at the top, bottom, left, or right side of the display to the content. Further to the example, the most lower right highlighted interactable element in the displayed content will be highlighted in a manner that correlates to the right-most and lower-most shape in a series/listing of coordinated matching related shapes. Other corresponding locational manners of presentation of associated/corresponding graphical elements/interactive elements-pairs are also possible.

Depending on the embodiment, the user may use the dwell of their gaze (occurring for at least a predetermined/ predefined time), with or without an additional gaze or non-gaze input, to activate the highlighted interactable element. Gaze location on the display device may be determined by employing an eye tracking device known in the art. The gaze interaction may occur with the highlighted content (i.e., interactive element), the shape (i.e., graphical element) associated with the highlighted content, and/or any visual element connecting the highlighted content with the shape. The shape associated with the highlighted content may be especially easy for a user to activate, as the size and shape of the associated shape may be designed to enhance the ability of the user to select it because it is larger and easier to visually acquire than the highlighted content itself. A logical algorithm may be employed to ensure lines or other visual elements coupling highlighted content to shapes do not cross each other and/or cause visual clutter or misunderstanding of available gaze interactable highlightable elements.

Which elements are highlighted at the original presentation of content in a web browser may be determined based on a number of possible algorithms known in the art for determining the most likely content within a group of content that the user will desire to interact with. Merely by way of example, in some embodiments, the systems and methods of the invention may determine what are the four interactable elements that the particular user is most likely to interact with based on past usage and/or interest history (note that more or fewer interactive elements may be identified depending on the embodiment). In these or other embodiments, the systems and methods of the invention may also take into account past usage or interest history for a larger group of users where more specific data is not available for the particular user at the display. A log in or registration procedure may allow the systems and methods here to identify and track/determine past usage and/or interest history for a user.

In many embodiments, the four (or other number) of interactive elements chosen for highlighting will depend solely or primarily on proximity to the user's present gaze point. In other words, the four closest interactable elements to the user's gaze point may be highlighted (including presentation of visually coupled or uncoupled shapes associated, potentially by color, etc., to the content). As discussed above, the background and foreground of highlighted text may be altered from the normal/default colors in such cases. In some instances, where a color-blind user is using the system, particular colors receptive to users with such conditions may be used instead of colors employed for users without color blindness. A 'color-blind' mode may be selectable by a user in these embodiments.

In some embodiments, the colors used may also depend on the location of the highlighted content within the display or web browser. For example, a first set of colors or other mode of highlighting may be used for interactive content in one quadrant of the display, while a second set of colors or other mode of highlighting may be used for interactive content in another quadrant or portion of the display. In these embodiments, graphical elements associated with each interactive element may be presented in corresponding locations (i.e., within on any given edge of the quadrant/location). In other embodiments, the quadrant or location which dictates the color or manner of highlighting will not affect the location of presentation of the graphical elements. In these or other embodiments, a first set of color or other mode of highlighting may be used for interactive content densely surrounded by other displayed content, while a second set of color or other mode of highlighting may be used for interactive content less densely surrounded by other displayed content.

While the above described systems and methods may be appropriate for many interactable elements, especially textual elements, systems and methods are also provided for highlighting and assisting the user with interactable elements of other textual/graphical types. For example, larger pictures or graphics, graphically presented text (i.e., a BMP, GIF, or JPG of text), or any other interactable element with similar size characteristics, may be highlighted by displaying a color bordered around the element. This color may or may not coordinate to the colored shape that is also displayed in proximity or not in proximity to the element as described above. This may allow for both regularly shaped interactable objects (square, circular, rectangular, etc.) to be made more accessible by embodiments of the invention, as well as irregular shaped interactable objects (outlines of irregular shapes, for example silhouette outlines, etc.).

Figure 4:
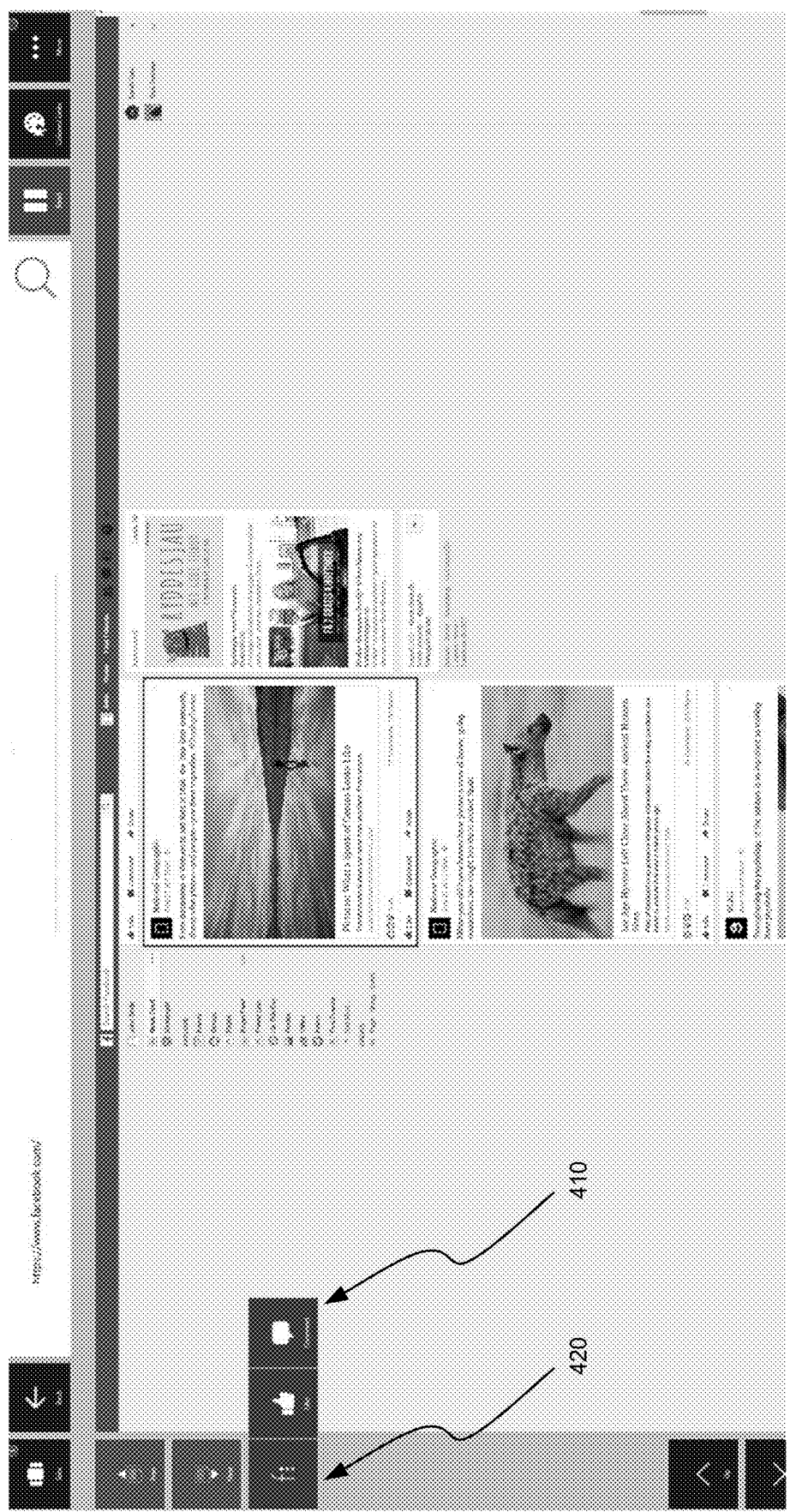
FIG. 4 shows a Facebook™ page implementing an embodiment of the invention.

Systems and methods of the invention may also be employed in particular or custom web pages viewed by the web browser, and/or other applications directly opened by the computing device for showing on the associated display, where interactable elements and controls are presented in similar, but slightly or greatly unusual or different manners compared to web browser. For example, when accessing Facebook™ and/or similar web pages and/or applications, a user, while wishing to select some interactable elements within the main display, may also wish to execute commands associated with and affecting these elements. FIG. 4 shows a web browser having an interface where common Facebook™ commands 410 are accessible by a gaze-activated Facebook™ command button 420. Upon the user dwelling on the command button 420, commands 410 may appear in proximity thereto. The command buttons 420 may correlate to often used commands/action when browsing the particular application or page involved (here, Facebook™.

YouTube™ is another web location in which such systems and methods may also be employed to select a large or small interactive element such as a video playback element, while also providing the ability to quickly access interactable elements which are controls or peripheral to the large interactive elements. For example, pause, play, skip, volume, display mode, and commenting controls can be accessed using the systems and methods described herein. As with the shapes discussed herein which may be displayed on the top, bottom, sides, or central portion of the display in tandem with the main content, such shapes may also be provided here, as well as additional gaze-dwell activated buttons which are provided to replicate the functions of interactable elements in the content which may be too small to effectively or conveniently activate using a gaze dwell. For example, a small play or pause button may be replicated as a larger gaze-interactable "button" (i.e., graphical element) or the like on the top, bottom, or side of the display.

While commands or controls associated with these elements may or may not be displayed alongside the content normally, the systems and methods of the invention may provide for matching gaze-activated control on the left, right, top, or bottom of the display. Additionally, they may be presented in order of importance or probable employment by the user, and/or in order of the improved ease at which such controls/commands assist over default command presented by Facebook™, or other similar page/application. Individual interactable elements within the content may also or alternatively be colored or otherwise highlighted to coordinate with the provided commands/controls. In some embodiments, only the control/command may be provided, while in other elements, only in-content highlighting may be provided. In other embodiments, which is provided may depend on user preferences and or the content of the object, or the linked content associated with the object.

In another embodiment, systems and methods for providing the ability via gaze input to snap-to, and then active, interactable elements is provided. In these embodiments, the determined location of the user's gaze direction of the display is determined, and then an indicator is provided at the location thereof. Because gaze determination does not always provide a constantly small and/or certain/consistent location of a gaze point on a display, the indicator may be of significant size to include an area about the determined gaze point. As such, the indicator may be a geometric or non-geometric shape, such as a square, rectangle, triangle, circle, oval, polygon, or other shape having lines and curves associated therewith. The area within the shape thus includes enough error from an estimated gaze point to account for some great percentage of likely determined gaze points about the user's true gaze point on the display.

Figure 5:
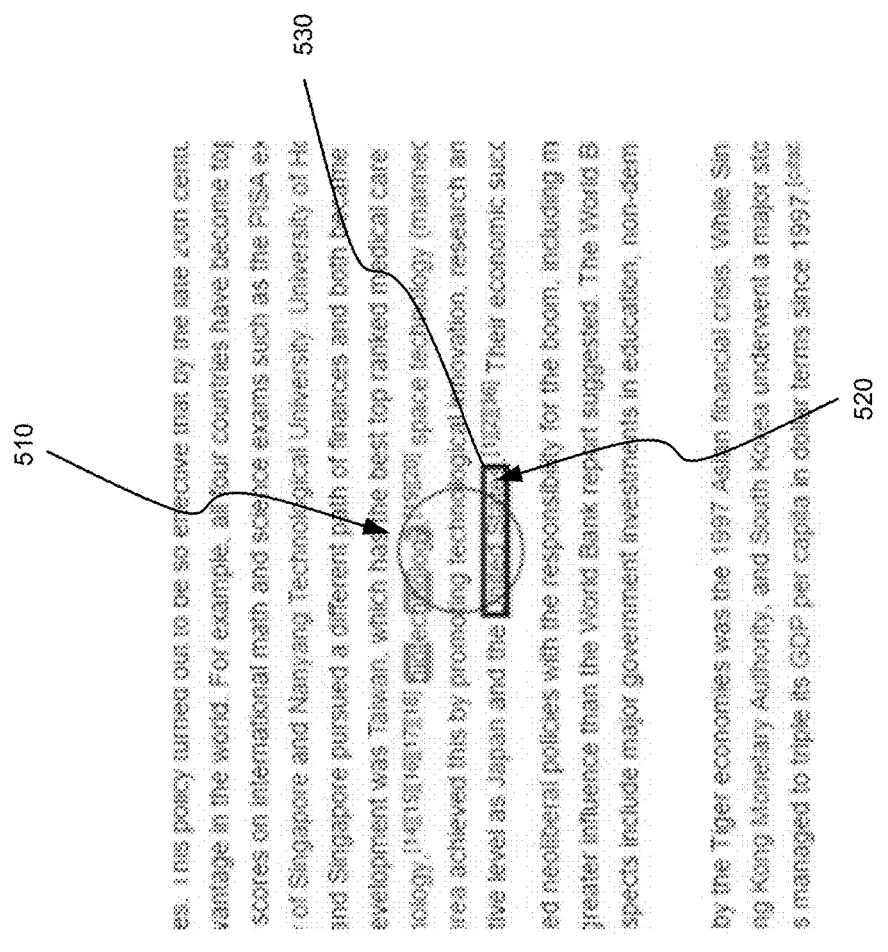

Upon providing the shape which approximates the user's gaze point on the display, as the user moves their gaze about the display, the shape will continue to follow and approximate their gaze position. See FIG. 5 showing a portion of text displayed by a web browser where the gaze indicator shape 510 is overlaying an interactive element 520 (i.e., "United States," a hyperlink). Upon the user nearing an interactive element with the gaze-following shape, and locating the shape at least partially over the interactable element, a box or other primary indicator 530 may show which element the system/method intends to activate should the user continue dwelling at that location. A secondary indicator may then be caused to appear on the interactable element. This secondary indicator informs the user that the interactive element will be activated if their gaze position (i.e., the shape approximating their gaze position) remains on the interactive element. The secondary indicator may change in size, for example, get smaller until it disappears, signaling to the user how much time is available to decide not to activate the interactable element by moving their gaze away from the interactable element. Upon the expiration of the give time/dwell period, the interactable element may be activated. For example, a the secondary indicator may be a dot which starts large, and then becomes small as the dwell time needed to active the interactable element is reached.

In some embodiments, the snap-to indicator shape which follows/reflects the user's gaze may also be zoom-able so that the size of the content within the snap-to indicator shape is more easily viewable to the user. In this mode, the size of the snap-to indicator shape may be made larger to allow for the zoomed-in content to be displayed more completely (i.e., the zoomed in content will require more room to display the same amount of information relative to the un-zoomed content). A user may select a particular zoom mode (i.e., out, in, %, etc.) via a gaze-dwell activated button on the top, bottom, or side of the screen to activate, select, and/or adjust zoom mode, as discussed herein for other functions.

In some embodiments, another type of secondary indicator may be a dynamic graphical bar which displays the total dwell time required upon a user's gaze first lying on an interactable element (or some time period thereafter), and then slowly changes color from left to right based on the amount of elapsed dwell time necessary for the interactable element to be activated. Upon the bar fully transitioning from one color to the next from left to right on the bar, the interactable element will be activated. In other words, the user may move their gaze away from the interactable element while the bar is changing colors, thereby preventing activation of the interactable element. However, once the bar has fully changed colors, the interactable element may be activated.

The time provided to a user to abort activation of the interactable element may depend on any number of factors, including based on the characteristics of the interactable element, the activated action/content of the interactive element, the history of the user, etc. For example, interactable elements which execute complex or un-routine actions, or call/display at least certain amounts of data for display, may have longer dwell-required periods than other interactable elements which execute simple or routine actions, or call/display less than certain amounts of date for display. By further way of example, if the particular user using the system/methods herein is known to the system/method, and the user often accidentally select elements, perhaps by dwelling too long on elements too often, the abort time period may be automatically lengthened compared to other users seeking to interact with similar interactable elements, based on the user's history of gaze-activated commands.

Figure 6:
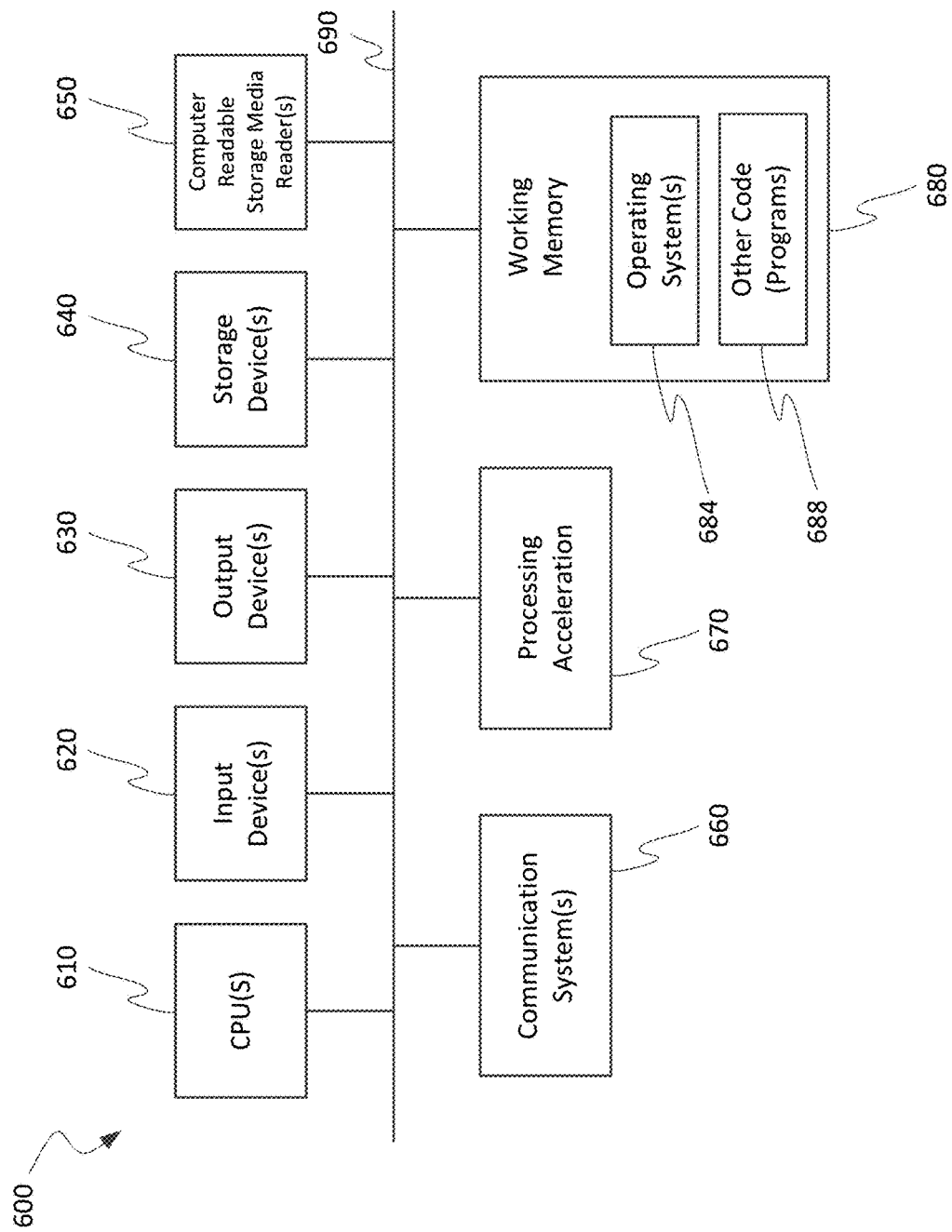
FIG. 6 is a block diagram of a specialized computer system capable of being used in at least some portion of the apparatuses or systems of the present invention, or implementing at least some portion of the methods of the present invention.

FIG. 6 is a block diagram illustrating a specialized computer system 600 in which embodiments of the present invention may be implemented. This example illustrates specialized computer system 600 such as may be used, in whole, in part, or with various modifications, to provide the functions of the eye tracking device, the computing system, and/or other components of the invention such as those discussed above.

Specialized computer system 600 is shown including hardware elements that may be electrically coupled via a bus 690. The hardware elements may include one or more central processing units 610, one or more input devices 620 (e.g., a mouse, a keyboard, an eye tracking device, etc.), and one or more output devices 630 (e.g., a display device, a printer, etc.). Specialized computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

Specialized computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, specialized computer system 600 may also include a processing acceleration unit 670, which can include a digital signal processor, a special-purpose processor and/or the like.

Computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. Communications system 660 may permit data to be exchanged with a network, system, computer and/or other component described above.

Specialized computer system 600 may also include software elements, shown as being currently located within a working memory 680, including an operating system 684 and/or other code 688. It should be appreciated that alternate embodiments of specialized computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of specialized computer system 600 may include code 688 for implementing any or all of the function of the various elements of the architecture as described herein. For example, software, stored on and/or executed by a specialized computer system such as specialized computer system 600, can provide the functions of the eye tracking device, the computing system, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of this disclosure.

What is claimed is:

1. A method for providing increased accessibility for users of interactive displayed content on a computing device and executing commands from these users on the computing device, the method comprising:
    analyzing, with one or more processors, content displayed on a display device to identify a plurality of interactive elements most likely to be interacted with by a user, wherein a plurality of primary indicators is associated with the plurality of interactive elements, each of the primary indicators being associated with a different interactive element;
    causing, with the one or more processors, each of the plurality of interactive elements to be highlighted in a different manner;
    determining, with at least an eye tracking device, a location of the user's gaze on the display device,
    causing, with the one or more processors, a gaze indicator shape to be displayed at the location of the user's gaze;
    causing, with the one or more processors, a primary indicator to be displayed on the display device upon the user nearing an interactive element with the gaze indicator shape, and locating the gaze indicator shape at least partially over the interactable element, wherein: and
    each of the primary indicators visually corresponds with highlighting of its associated interactive element;
    causing, with the one or more processors, a secondary indicator to appear on the interactable element, wherein the secondary indicator informs the user that the interactive element will be activated if the location of the gaze remains on the interactive element.

2. The method for providing increased accessibility for users of interactive displayed content on a computing device and executing commands from these users on the computing device of claim 1, wherein causing the particular interactive element to be activated is further based at least in part on:
    the user gazing at the interactive element for at least a predefined length of time.

3. The method for providing increased accessibility for users of interactive displayed content on a computing device and executing commands from these users on the computing device of claim 2, wherein:
    the predefined time varies based at least in part on what action is caused by the particular interactive element.

4. The method for providing increased accessibility for users of interactive displayed content on a computing device and executing commands from these users on the computing device of claim 1, wherein causing the particular interactive element to be activated is further based at least in part on:
    a non-gaze input being received at a non-gaze input device while the user is gazing at the particular interactive element.

5. The method for providing increased accessibility for users of interactive displayed content on a computing device and executing commands from these users on the computing device of claim 1, wherein a manner of highlighting of the particular interactive element is based at least in part on:
    content of the particular interactive element.

6. The method for providing increased accessibility for users of interactive displayed content on a computing device and executing commands from these users on the computing device of claim 1, wherein a manner of highlighting of the particular interactive element is based at least in part on:
    content displayed on the display device upon activation of the particular element.

7. A system for providing increased accessibility for users of interactive displayed content on a computing device and executing commands from these users on the computing device, the system comprising:
    a display device configured to display content to a user;
    an eye tracking device configured to determine a location of a user's gaze on a display device;
    one or more processors configured to:
    analyze content displayed on the display device to identify a plurality of interactive elements most likely to be interacted with by the user, wherein a plurality of primary indicators is associated with the plurality of interactive elements, each of the primary indicators being associated with a different interactive element;
    cause each of the plurality of interactive elements to be highlighted in a different manner;
    cause a gaze indicator shape to be displayed at the location of the user's gaze;
    cause a primary indicator to be displayed upon the user nearing an interactive element with the gaze indicator shape, and locating the gaze indicator shape at least partially over the interactable element,
    cause a secondary indicator to appear on the interactable element, wherein the secondary indicator informs the user that the interactive element will be activated if the location of the gaze remains on the interactive element.

8. The system for providing increased accessibility for users of interactive displayed content on a computing device and executing commands from these users on the computing device of claim 7, wherein causing the particular interactive element to be activated is further based at least in part on:
    the user gazing at the interactive element for at least a predefined length of time.

9. A non-transitory machine readable medium having instructions stored thereon for providing increased accessibility for users of interactive displayed content on a computing device and executing commands from these users on the computing device, wherein the instructions are executable by one or more processors to perform operations comprising:
    analyzing content displayed on a display device to identify a plurality of interactive elements most likely to be interacted with by a user, wherein a plurality of primary indicators is associated with the plurality of interactive elements, each of the primary indicators being associated with a different interactive element;
    causing each of the plurality of interactive elements to be highlighted in a different manner;
    determining, using an eye tracking device, a location of the user's gaze on the display device;

causing a of a primary indicator to be displayed on the display device upon the user nearing an interactive element with the gaze indicator shape, and locating the gaze indicator shape at least partially over the interactable element, wherein:

causing, with the one or more processors, a secondary indicator to appear on the interactable element, wherein the secondary indicator informs the user that the interactive element will be activated if the location of the gaze remains on the interactive element.

10. The non-transitory machine readable medium having instructions stored thereon for providing increased accessibility for users of interactive displayed content on a computing device and executing commands from these users on the computing device of claim 9, wherein causing the particular interactive element to be activated is further based at least in part on:

the user gazing at the interactive element for at least a predefined length of time.

11. The method for providing increased accessibility for users of interactive displayed content on a computing device and executing commands from these users on the computing device of claim 1, wherein the secondary indicator changes in size signaling to the user how much time is available to decide not to activate the interactable element by moving their gaze away from the interactable element.

12. The method for providing increased accessibility for users of interactive displayed content on a computing device and executing commands from these users on the computing device of claim 1, wherein the secondary indicator is a dynamic graphical bar which displays the total dwell time required upon a user's gaze first lying on an interactable element, and then slowly changes color from left to right based on the amount of elapsed dwell time necessary for the interactable element to be activated.

13. The method for providing increased accessibility for users of interactive displayed content on a computing device and executing commands from these users on the computing device of claim 1, wherein the gaze indicator shape is zoom-able so that the size of the content within the snap-to indicator shape is more easily viewable to the user.

14. The system for providing increased accessibility for users of interactive displayed content on a computing device and executing commands from these users on the computing device according to claim 7, wherein the secondary indicator changes in size signaling to the user how much time is available to decide not to activate the interactable element by moving their gaze away from the interactable element.

15. The system for providing increased accessibility for users of interactive displayed content on a computing device and executing commands from these users on the computing device according to claim 7, wherein the secondary indicator is a dynamic graphical bar which displays the total dwell time required upon a user's gaze first lying on an interactable element, and then slowly changes color from left to right based on the amount of elapsed dwell time necessary for the interactable element to be activated.

16. The system for providing increased accessibility for users of interactive displayed content on a computing device and executing commands from these users on the computing device according to claim 7, wherein the gaze indicator shape is zoom-able so that the size of the content within the snap-to indicator shape is more easily viewable to the user.

17. A non-transitory machine readable medium having instructions stored thereon for providing increased accessibility for users of interactive displayed content on a computing device and executing commands from these users on the computing device according to claim 9, wherein the secondary indicator changes in size signaling to the user how much time is available to decide not to activate the interactable element by moving their gaze away from the interactable element.

18. A non-transitory machine readable medium having instructions stored thereon for providing increased accessibility for users of interactive displayed content on a computing device and executing commands from these users on the computing device according to claim 9, wherein the secondary indicator is a dynamic graphical bar which displays the total dwell time required upon a user's gaze first lying on an interactable element, and then slowly changes color from left to right based on the amount of elapsed dwell time necessary for the interactable element to be activated.

* * * * *